July 7, 1925.

A. HERMANSEN

HEAT ECONOMIZER

Filed Feb. 12, 1924

1,544,905

INVENTOR
Axel Hermansen
BY
Ramsay Hoguet
ATTORNEY

Patented July 7, 1925.

1,544,905

UNITED STATES PATENT OFFICE.

AXEL HERMANSEN, OF INGELSTAD, SWEDEN.

HEAT ECONOMIZER.

Application filed February 12, 1924. Serial No. 692,301.

*To all whom it may concern:*

Be it known that I, AXEL HERMANSEN, a subject of the Kingdom of Sweden, residing at Ingelstad Gard, Ingelstad, Sweden, have invented an Improvement in Heat Economizers, of which the following is a specification.

This invention relates to an apparatus for utilizing the waste heat from furnaces of the type using recuperators or regenerators and resides broadly in the most economical distribution of the stack gases to effect a fuel economy.

The invention contemplates the division of the stack gases from the furnace, the utilization of a portion thereof to supply sufficient heat to the recuperator or regenerator and the utilization of the remainder of the gases by passing them to a heat absorption device such for instance as a boiler or a water pre-heater.

The invention makes it possible to use a lighter and cheaper construction of recuperator or regenerator than where the entire stack gases are led through either of the same, thus saving not only a considerable portion of the initial construction charge, but also effecting the greatest economy of heat since only the required amount is carried to the regenerator or recuperator and the remainder is conveyed to the absorption device. Furthermore, the gases are divided immediately upon leaving the furnace so that a portion of the same enters the regenerator or recuperator at a high temperature, and the remainder is conveyed to the absorption device under similar conditions.

In the drawing I have shown one application of my invention where a recuperator is used in conjunction with the furnace and where the absorption device takes the form of a fire tube boiler. In the drawing.

Figure 1:
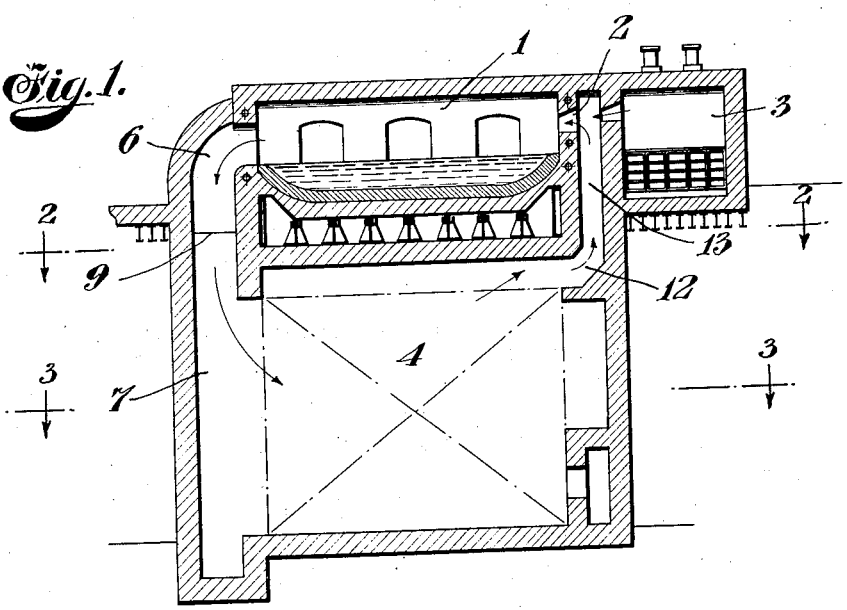
Fig. 1 is a vertical sectional view through the furnace and recuperator.

In this embodiment the furnace 1 may be heated by any suitable means such, for instance, as by flame from burners 2 leading from a gas producer 3. A recuperator 4 and a boiler 5 are arranged in close proximity to the furnace and have communication with a common duct 6 which communicates with the furnace through separate ducts 7 and 8 respectively, the latter being formed preferably by partition 9 which divides the lower end of the duct 6 into the individual ducts 7 and 8. A common flue 10 is arranged at the ends of the recuperator and boiler opposite to the ducts 7 and 8 and leads to a stack 11. The heated air from the recuperator is led to the burner 2 from the space 12 and through the passage 13.

The gases from the furnace pass to the common duct 6 and are divided therein by the vertical partition 9, a portion of the gases passing to the recuperator 4 through the duct 7 and the remainder passing to the boiler 5 through the duct 8. It will be noted that the gases are divided in close proximity to the furnace and that the recuperator is arranged adjacent the furnace which results in the supply of the proper amount of gas to the recuperator at a very high temperature running usually over 1000° C.

The gases passing through the recuperator escape through the flue 10 to the stack 11 while the gases passing from the boiler 5 likewise escape through the flue 10 and the stack 11.

Figure 2:
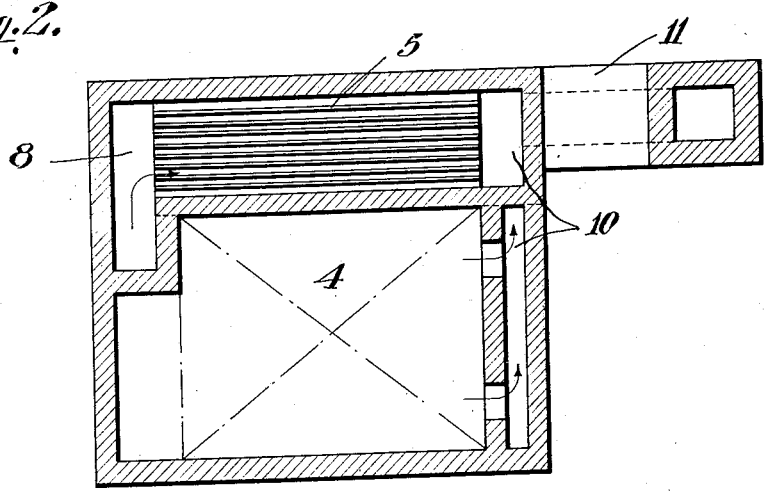
Fig. 2 is a horizontal sectional view showing a convenient disposition of the boiler.
Figure 3:
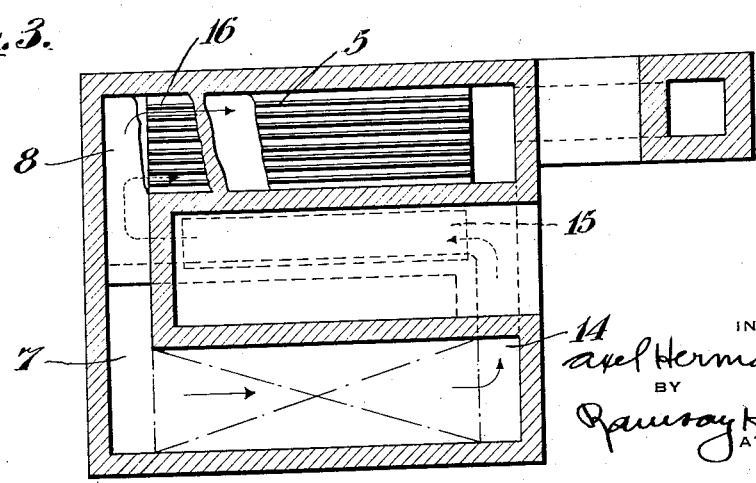
Fig. 3 is a horizontal sectional view illustrating the manner in which the gases after passing through the recuperator are used in superheating the steam from the boiler and subsequently preheat the water.

The division and utilization of the flue gases in the manner in which I have above described makes possible the further use of the gases passing from the recuperator and the further economizing of the fuel. For instance, in Fig. 3 I have illustrated in horizontal section and conventionally, the association of a steam superheater and a water preheater with the recuperator. The gases from the furnace 1 (not shown in this figure) are divided and pass to the boiler 5 and to the recuperator 4 through the ducts 8 and 7 respectively. Instead of the gases, after passing from the recuperator, being discharged into the stack as in the description given in connection with Figs. 1 and 2, the gases follow a duct 14 passing in the direction of the dotted line arrows. In this passage a steam superheater 15 is arranged so that the gases upon being discharged from the recuperator supply heat to this superheater. A water preheater 16 is arranged in this passage and preferably beneath the boiler 5 so that the gases are supplied to this water preheater before being discharged into the stack 11. It will.

therefore, be seen that the maximum amount of heat will be absorbed, by the various devices, from the discharge gases from the furnace so that when the gases reach the stack they will be only at sufficient temperature to create the necessary draft.

By way of an example, assuming that the gases as they leave the furnace are 1000° C. and are divided in the manner described, that portion which goes to the boiler initially is at this temperature, the boiler being arranged in close proximity to the furnace. In the heat exchange the temperature is reduced either by the gases passing once through the boiler or by passing the gases back and forth therethrough until the temperature is reduced substantially to the point necessary to create the draught in the stack. The gases which pass to the recuperator are likewise at substantially 1000° C. as the recuperator is, too, arranged in close proximity to the furnace, but the heat absorption in the recuperator is necessarily smaller than in the boiler so that there is a smaller reduction in the temperature of the gases. The gases, therefore, leave the recuperator at a higher temperature and sufficiently high to superheat the generated steam in the superheater 15. Thereafter the temperature of the gases as they pass from the superheater is high enough to preheat the water before it enters the boiler and for this reason the gases may be passed through this preheater exhausting therefrom at a temperature sufficiently high to create the necessary draught in the stack.

The result is, as I have hereinbefore pointed out, a very considerable fuel economy and a very considerable economy in the initial construction since the recuperator or regenerator is built to take care of only a sufficient amount of gas at a high temperature to make it properly function, and since the remaining gases are led to the heat absorption device also at higher temperature which, together with the recuperator, are in close proximity to the furnace. While I have illustrated the invention as applicable to a recuperative furnace, it is equally applicable to a regenerative furnace and the heat absorption device need not be in the form of a boiler, but may be used for other furnaces operated by lower temperatures, drying plants or other uses.

What I claim is:

1. The combination with a furnace of a recuperator for supplying heated air to the furnace to support combustion, a heat absorption device, and means for dividing the flue gases from the furnace and leading them separately to the recuperator and heat absorption device.

2. The combination with a furnace of a recuperator for supplying heated air to the furnace to support combustion, a heat absorption device located in close proximity thereto, and means for dividing the flue gases near their point of exit from the furnace and conveying them separately to the recuperator and heat absorption device.

3. The combination with a furnace of a recuperator for supplying heated air to the furnace to support combustion, heating absorption device, and means for conveying only sufficient of the hot gases from the furnace to the recuperator to serve the latter and conveying the remainder of the gases to the heat absorption device.

4. The combination with a furnace of a recuperator for supplying heated air to the furnace to support combustion, a heat absorption device arranged adjacent thereto, a short gas duct leading from the furnace and short ducts leading from the aforementioned duct to the recuperator and heat absorption device.

5. The combination with a furnace of a recuperator, a boiler, a steam superheater and a water preheater, means for conveying part of the hot gases from the furnace to the boiler and the remainder to the recuperator, and means for conveying the gases as they pass from the recuperator successively to the steam superheater and water preheater.

6. The combination with a furnace of a recuperator, a boiler, and a series of heat absorption devices operating at lower temperature than the recuperator arranged in series with the same, and means for dividing the hot gases from the furnace and conveying a part thereof to the boiler and the remainder successively to the recuperator and the heat absorption devices.

7. A furnace of the class described having, in combination, an open hearth melting chamber, an apparatus for heating air and directing it into the melting chamber to support combustion, a heat absorption apparatus, and means for distributing the waste gases leaving the melting chamber in part to said air heating apparatus and in part to said heat absorption apparatus.

8. A furnace comprising a casing having a melting chamber in the upper part thereof, a recuperator chamber and a boiler chamber located beneath the melting chamber, and means for dividing the waste gases as they leave the melting chamber and leading them separately to the recuperator and boiler chambers.

In testimony whereof, I have signed my name to this specification this 9th day of February, 1924.

AXEL HERMANSEN.